(12) United States Patent
Barban

(10) Patent No.: US 8,747,067 B2
(45) Date of Patent: Jun. 10, 2014

(54) TRILLIUM WIND TURBINE

(71) Applicant: Reno Barban, Boulder, CO (US)

(72) Inventor: Reno Barban, Boulder, CO (US)

( * ) Notice: Subject to any disclaimer, the term of this patent is extended or adjusted under 35 U.S.C. 154(b) by 0 days.

(21) Appl. No.: 14/052,679

(22) Filed: Oct. 11, 2013

(65) Prior Publication Data

US 2014/0105740 A1 Apr. 17, 2014

Related U.S. Application Data

(60) Provisional application No. 61/712,263, filed on Oct. 11, 2012.

(51) Int. Cl.
*F03D 1/00* (2006.01)

(52) U.S. Cl.
USPC ............. 416/11; 416/228; 416/235; 416/238; 415/4.3; 415/4.5

(58) Field of Classification Search
CPC ... F03D 1/0675; F03D 1/0683; F03D 1/0633; F03D 1/0641; F05D 2240/303; F05D 2240/304; Y02E 10/721

USPC ......... 416/11, 235, 238; 415/4.3, 4.5; 290/44, 290/55

See application file for complete search history.

(56) References Cited

U.S. PATENT DOCUMENTS

| 1,628,716 | A | * | 5/1927 | Fischer | 416/234 |
| 2,021,707 | A | * | 11/1935 | Upson | 416/229 R |
| 4,128,363 | A | * | 12/1978 | Fujikake et al. | 416/236 A |
| 5,178,518 | A | * | 1/1993 | Carter, Sr. | 416/11 |

* cited by examiner

*Primary Examiner* — Ninh H Nguyen

(57) ABSTRACT

A trillium wind turbine has an electricity-generating nacelle and swept-back, complexly-curved blades. Each blade has a main blade, a trailing edge blade, and a diversion blade. Wind is directed down the length of the blade and exits the tip. The main blade resembles a portion of a cylinder in form, the cylinder being twisted to change the angle of attack, thereby adding more lift throughout the length of the blade. The trailing edge and diversion blades are pitched relative to the wind and produce lift. Additionally, wind hitting the diversion blade is diverted behind the blade. Because the surface area and volume of the blade are larger near the nacelle and smaller at the tip, the air that travels along the blade increases in velocity as it travels producing more thrust/lift. The turbine also automatically faces into the wind without the need for sensors or positioning motors.

20 Claims, 13 Drawing Sheets

TRILLIUM WIND TURBINE

CROSS-REFERENCE TO RELATED APPLICATIONS

This application claims the benefit of U.S. Provisional Application No. 61/712,263 entitled TRILLIUM WIND TURBINE and filed on Oct. 11, 2012, which is specifically incorporated by reference herein for all that it discloses and teaches.

TECHNICAL FIELD

The invention relates generally to the field of wind turbines and wind power generation, and more particularly to a Trillium Wind Turbine apparatus.

BACKGROUND

Conversion of wind energy into a useful form of power has a long and storied history. For example, windmills were known and used by the Greeks at least by the first century AD; and windpumps or other wind-powered irrigation technologies were known hundreds of years earlier. Although still in use today to some degree, windmills, windpumps, and other wind-powered machinery have dramatically decreased in importance since the rise of fossil fuels. However, with increasing pollution, potential climate-change, and growing scarcity of these fuels, there has been a surge of interest in generating clean, renewable power from the wind.

Conventional wind turbines have been used to make electricity for more than a century. At the turn of the twentieth century, wind turbines were growing in popularity and their usefulness was recognized across the world. Today, commercial wind turbines can be found nearly anywhere the wind blows, from farms, to ranches, deserts and even open ocean.

However, conventional wind turbines have a number of problems and limitations. One of the most significant issues is that the wind often does not blow strongly enough throughout the day, nor can it be relied upon to blow adequately in a given location over a longer time span. Some locales have long histories of higher-than-average winds and, as such, are often targeted as potential sites for wind turbines. Nevertheless, even such high-grade wind sites have periods (sometimes days at a stretch) when the winds are light. Conventional turbines often require wind speeds of five, eight, or even ten miles-per-hour or higher before they start generating significant amounts of electricity. Furthermore, when the wind speed is too high, conventional wind turbines have to be adjusted so that the wind's effect on the blades is lessened or the blades may be deflected back into the support tower or otherwise become damaged. An additional problem with convention wind turbine systems is that they must employ an additional efficiency robbing system that senses wind direction and then actuates a servo motor to turn the turbine into the wind. When the winds constantly change direction, such systems do not respond quickly enough and lose efficiency.

What is needed is an advanced wind turbine apparatus that activates at lower-speed winds and can produce significant amounts of electricity at wind speeds below those required for conventional wind turbines. Furthermore, an advanced wind turbine apparatus should also weather high-speed wind situations without damaging its support tower or blades and should automatically align itself in the direction from which the wind is blowing without utilizing inefficient sensors and servo motors.

SUMMARY

One embodiment of the present invention comprises an apparatus having an electricity-generating, aerodynamic nacelle and a plurality of swept-back, complexly-curved blades. The blades can be made from any material that is lightweight and strong. Each blade has three primary subcomponents: a main blade, a trailing edge blade, and a diversion blade. The blades are pitched back with the face of the blade adjacent to the nacelle at roughly ninety degrees relative to the direction of the wind. This pushes the wind down the entire length of the blade before exiting at the tip. The main blade resembles a half-tube or portion of a cylinder in form, the tube being twisted approximately ninety degrees from the nacelle to the tip. This twist effectively and continuously changes the angle of attack, thereby adding more lift (without stall) throughout the length of the blade. The trailing edge blade is pitched relative to the direction of the wind, thus producing more lift. The diversion blade is also at a pitch relative to the direction of the wind. Thus, when wind hits the diversion blade it produces additional lift. Additionally, because of the shape and placement of the diversion blade, the wind hitting the diversion blade is diverted behind the blade so as to not interfere with the wind traveling along the length of the main blade from the nacelle to the tip. And because the surface area/volume is much bigger near the nacelle and smaller at the tip, the air that travels along the main blade increases in velocity as it travels down the blade producing more thrust/lift. All of these features cause the advanced trillium wind turbine apparatus to be much more efficient than conventional wind turbines and thus allows the trillium to produce electricity in winds so light that other wind turbines stall out and cease to function. Furthermore, in more moderate winds, the trillium wind turbine extracts more usable energy from the wind, effectively allowing it to spin a larger generator than a conventional turbine (or spin the same size generator at a greater speed). In either case, the trillium wind turbine apparatus can produce more electricity versus a conventional wind turbine system. Additionally, because the tower/support structure that holds the blades and nacelle up in the air is attached to the nacelle and the blades are swept back behind the nacelle, the trillium wind turbine automatically faces into the wind without the need for inefficient sensor(s) and additional positioning motor(s).

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
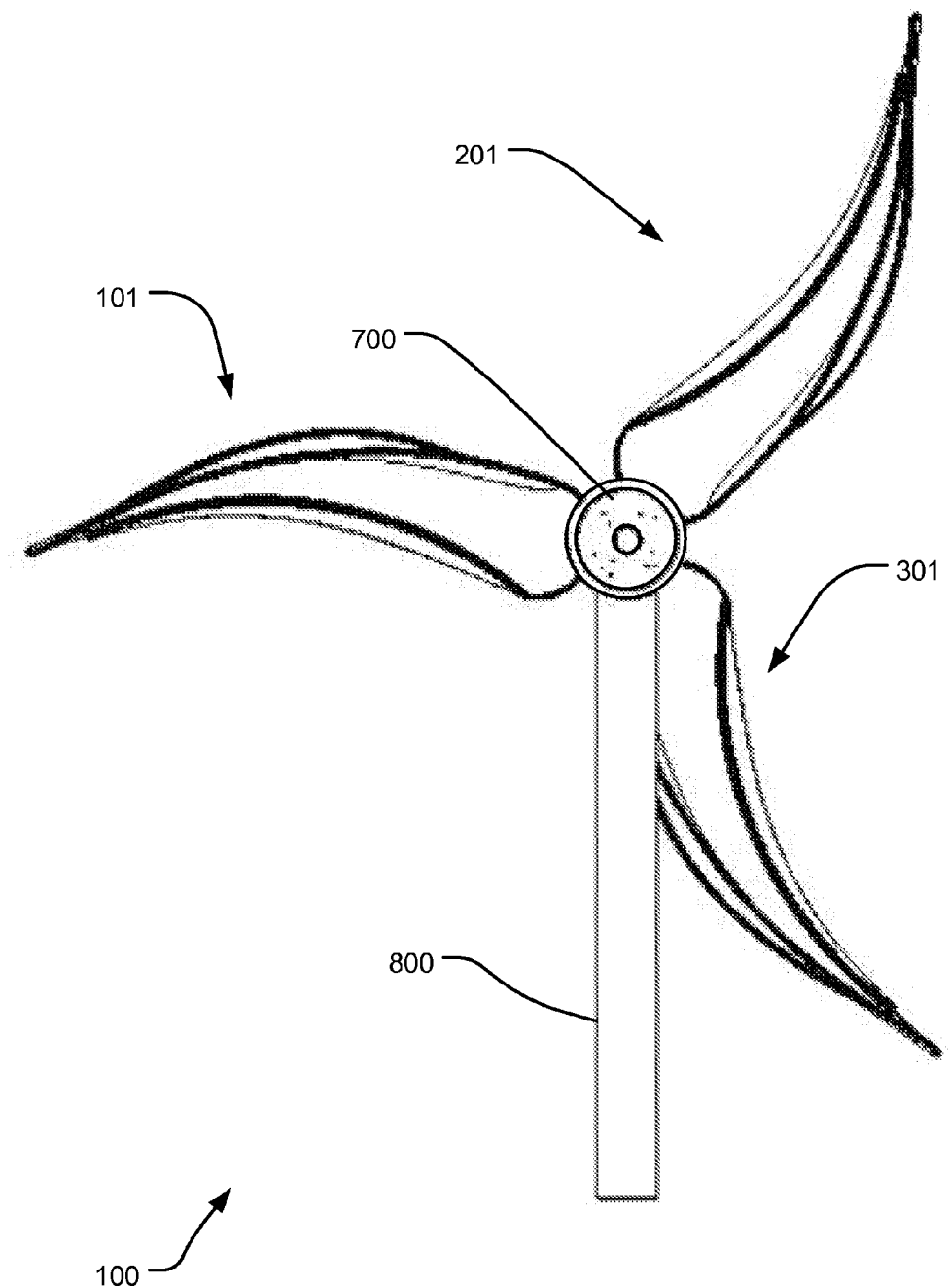
FIG. 1 shows a front elevation view of an exemplary embodiment of a trillium wind turbine.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 shows a front elevation view of an exemplary embodiment of a trillium wind turbine 100. In the embodiment shown in FIG. 1, the wind turbine apparatus 100 employs three blades 101, 102, and 103. In other embodiments, the number of blades 101, 102, and 103 can be one, two, three, four, or more. The individual components that make up each of the blades are not highlighted in FIG. 1, see FIG. 6.

The aerodynamically-shaped, electricity generating nacelle 700 is shown in FIG. 1 as being located in front of the plurality of blades 101, 201, and 301 with the tower/support structure 800 mounted to the nacelle 700. This location has a number of benefits. First, because the mounting tower/support structure 800 attaches to the nacelle 700, and the blades 101, 201, and 301 are swept-back from the nacelle 700 (and attached to the rotor shaft, not shown in FIG. 1, see rotor shaft 750 in FIG. 2), the blades can not be forced by high winds into impacting with the tower 800 (as could happen in conventional wind turbine systems where the blades are in front of the tower and can be distorted or bent backwards in very high-wind situations). Additionally, because the blades 101, 201, and 301 are attached to the rotor shaft behind the nacelle 700 and the tower 800 and are swept backwards, the apparatus automatically turns to face into the wind. This is accomplished by a turntable device (or any similarly functioning device) between the tower 800 and the nacelle 700 which allows the nacelle and blades to turn to face any direction. And, as the wind blows against the turbine, the turbine provides the least resistance to the wind when it is directly facing into it, thus, the wind automatically turns the turbine into the wind. This provides a significant advantage over other systems which require the use of a sensor and an actuator motor to ensure that the wind turbine is always facing directly into the wind.

It is preferred that the tower/support-structure 800 be attached to the nacelle 700 and in front of the plurality of blades 101, 201, and 301 with the nacelle 700 extending forward of the blades, and the blades sweeping back therefrom. As illustrated in FIG. 1, with the blades 101, 201, and 301 being positioned behind the nacelle 700 and tower 800, the blades act as a vane and help to keep the entire trillium wind turbine 100 oriented into the wind.

Figure 2:
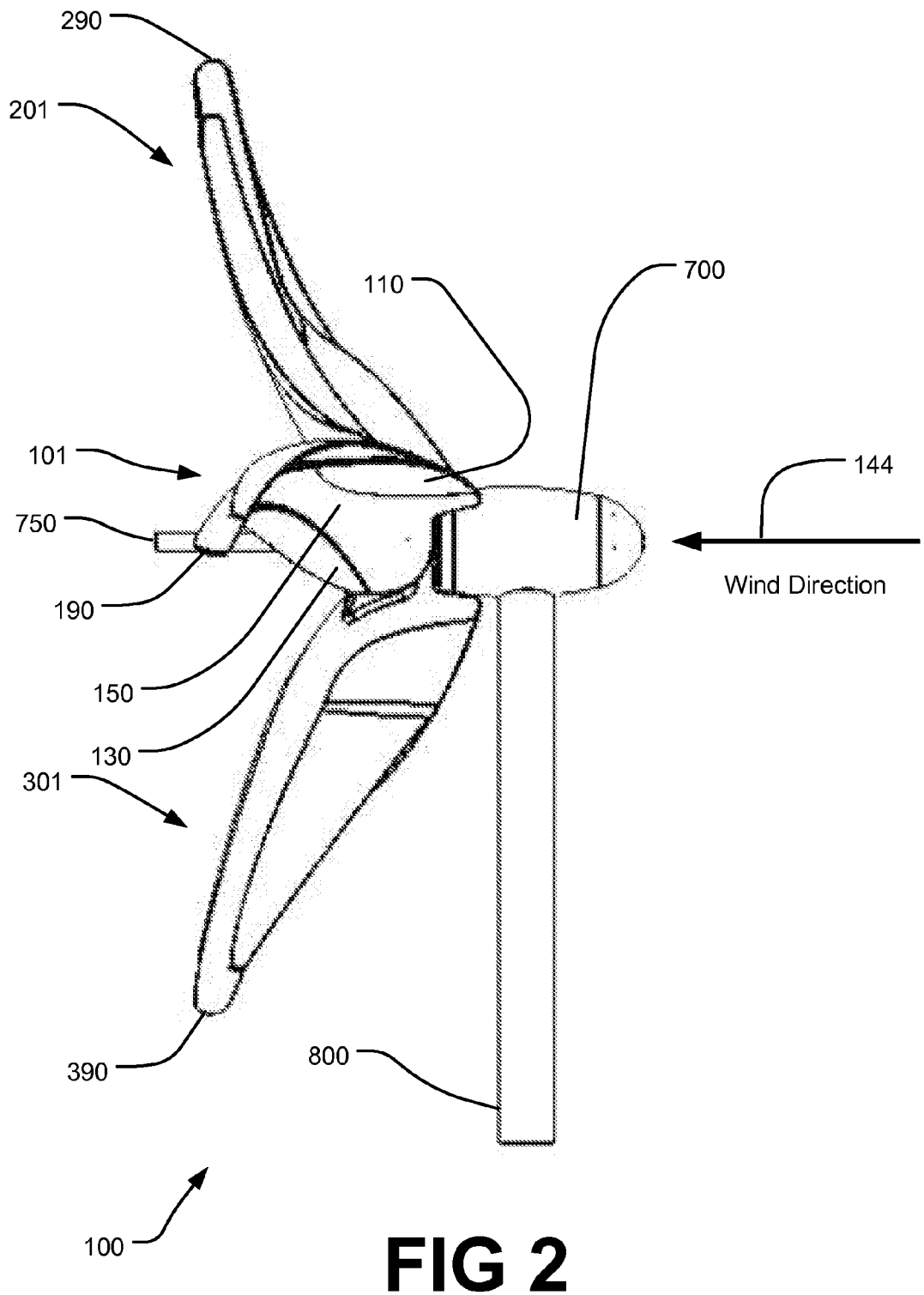
FIG. 2 illustrates a left elevation view of an exemplary embodiment of a trillium wind turbine.

FIG. 2 illustrates a left elevation view of an exemplary embodiment of a trillium wind turbine 100. The turbine 100 is illustrated from the side so that the swept-back nature of the blades 101, 201, and 301 is apparent (note attachment of the blades behind the nacelle 700 and the location of the blade tips 190, 290, and 390 well back from the nacelle 700).

The blades 101, 201 and 301 are and cupped inwards to catch and direct the incoming wind 144 down the length of the blade. Using what is the middle blade 101 in this view as an example, each blade has an edge extension 110 and a trailing edge blade 130 that, together with the main blade 150 between them, form a trough or partial tube/cylinder extending from the nacelle 700 outwards and back to the tip of the blade 190. The edge extension 110 extends from the nacelle 700 down towards the tip of the blade 190, first rapidly increasing in height from the main blade 150 and then gradually decreasing before disappearing completely before reaching the blade tip 190. The trailing edge blade 130 also first increases and then decreases in height relative to the main blade 150, and eventually disappears completely as well before reaching the tip 190. The main blade 150 funnels the incoming wind down the blade 101 and extends through to the tip of the blade 190. See FIGS. 7A-7F for more detail of the blade shape.

The twist of the blades 101, 201, and 301 also helps direct the incoming wind 144 so that it acts on the edge extension 110, trailing edge blade 130 and main blade 150 to spin the blade 101 on the rotor 750. The front surface of the main blade 150 faces approximately forwards into the incoming wind 144 near the nacelle; and, at the blade tip 190, it eventually twists nearly ninety degrees to face approximately downwards.

In the embodiment shown in FIG. 2, the rotor shaft 750 is clearly visible. It extends into the nacelle 700 and serves to transfer the rotary motion of the blades 101, 201, and 301 into rotational energy which the nacelle 700 converts into electricity. The rotor shaft 750 is connected to each blade by an attachment block (see items 760, 770, and 780 in FIG. 3).

FIG. 2 also clearly illustrates the relative position of the nacelle 700, the swept-back blades 101, 201 and 301, and the support structure/tower 800. As can be seen by the Wind Direction arrow 144, the wind is blowing from the right and contacts first the nacelle 700, then the tower 800, and finally the blades 101, 201 and 301. This configuration allows the trillium wind turbine 100 to automatically face into the wind as wind pressure against the blades causes them to act like vanes, forcing the nacelle 700 to spin on its mounting atop the tower 800 to point directly into the wind.

Figure 3:
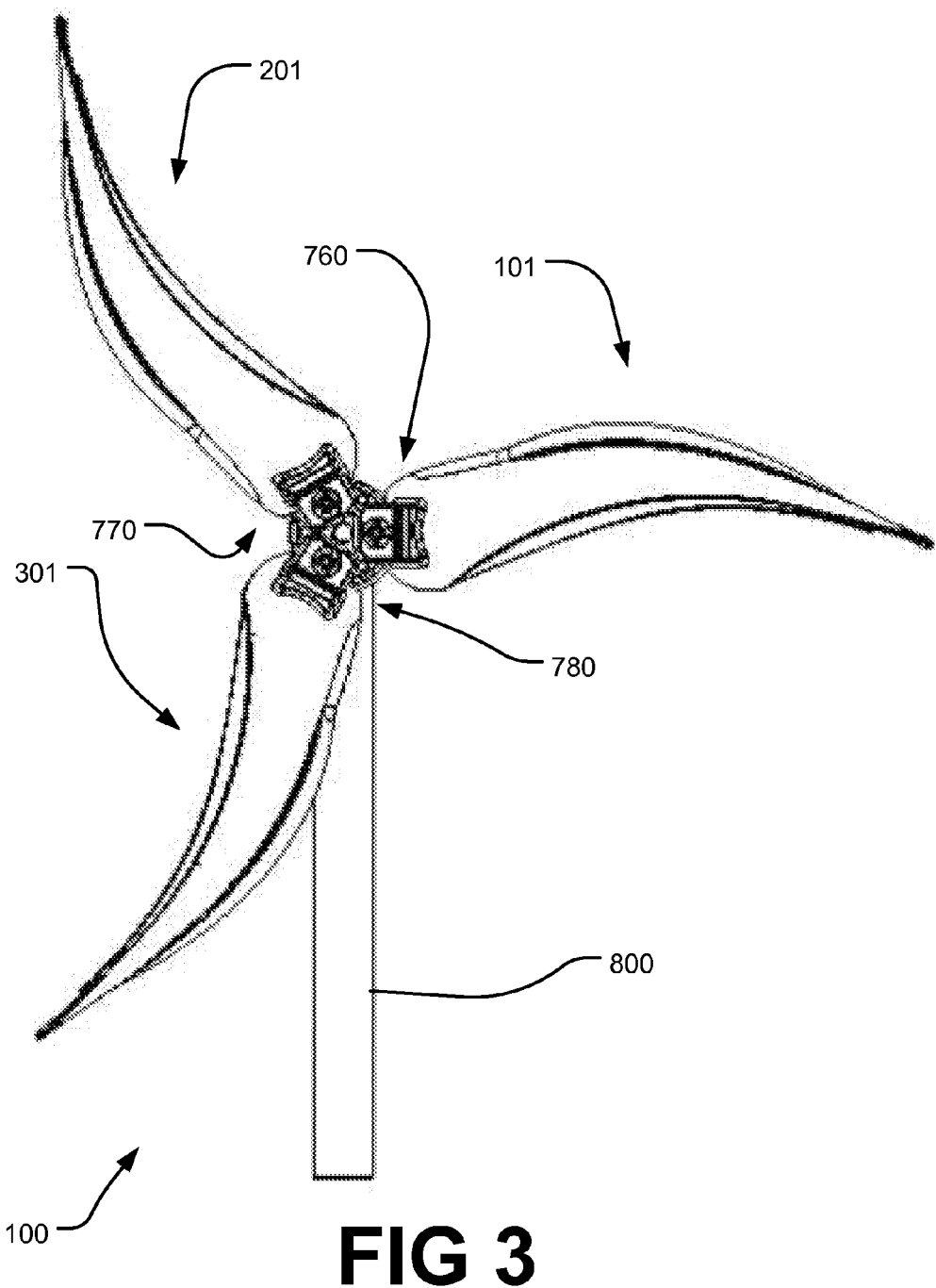
FIG. 3 illustrates a back elevation view of an exemplary embodiment of a trillium wind turbine.

FIG. 3 illustrates a back elevation view of an exemplary embodiment of a trillium wind turbine 100. The turbine 100 is illustrated in the three-blade 101, 201, and 301 configuration of FIGS. 1-2. The back view shown in FIG. 3 provides a view of the three blade attachment blocks 760, 770 and 780. The attachment blocks are an exemplary means for securing the blades 101, 201, and 301 to the rotor shaft and the nacelle 700.

Figure 4:
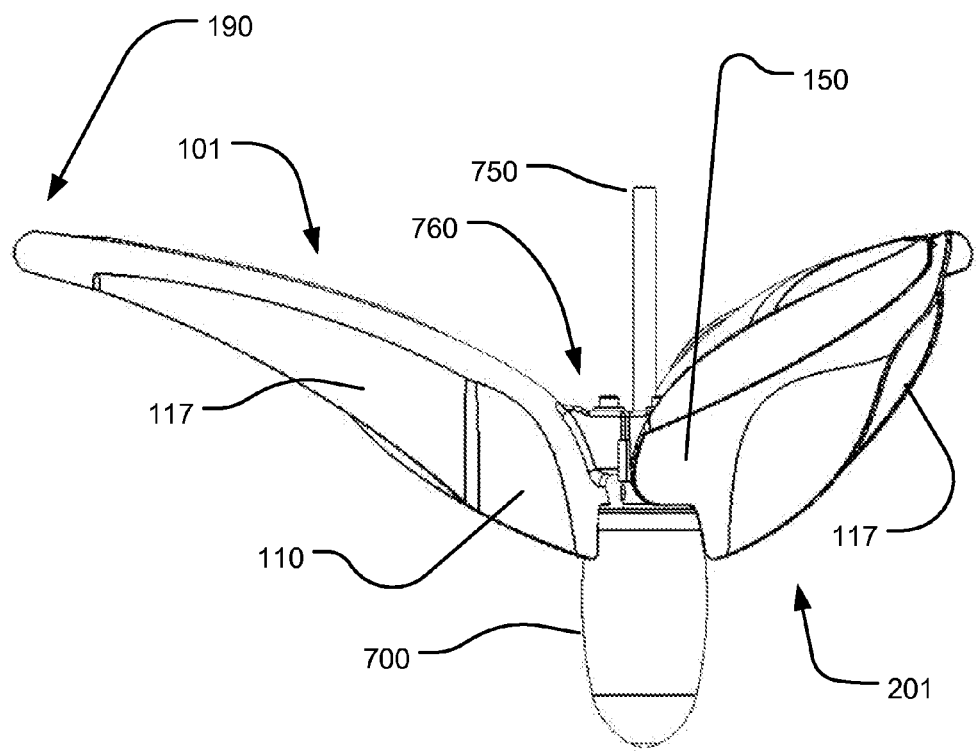
FIG. 4 illustrates a top plan view of an exemplary embodiment of a trillium wind turbine.

FIG. 4 illustrates a top plan view of an exemplary embodiment of a trillium wind turbine 100. A single blade attachment block 760 is visible in this view and it should be apparent to one skilled in the art that other types of attachment mechanisms can be used to secure a blade to the rotor shaft 750 and/or nacelle 700. In this view, the sides of the blades are shown to more clearly illustrate the shape of the main blade 150 and the location and shape of the diversion blade 117 relative to the edge extension 110 and the tip 190. The general size and shape of the blade 150 is illustrated: the area and volume of the blade adjacent to the nacelle is the greatest and then reduces along the length of the blade until the area and volume of the blade is very small at the tip.

Figure 5:
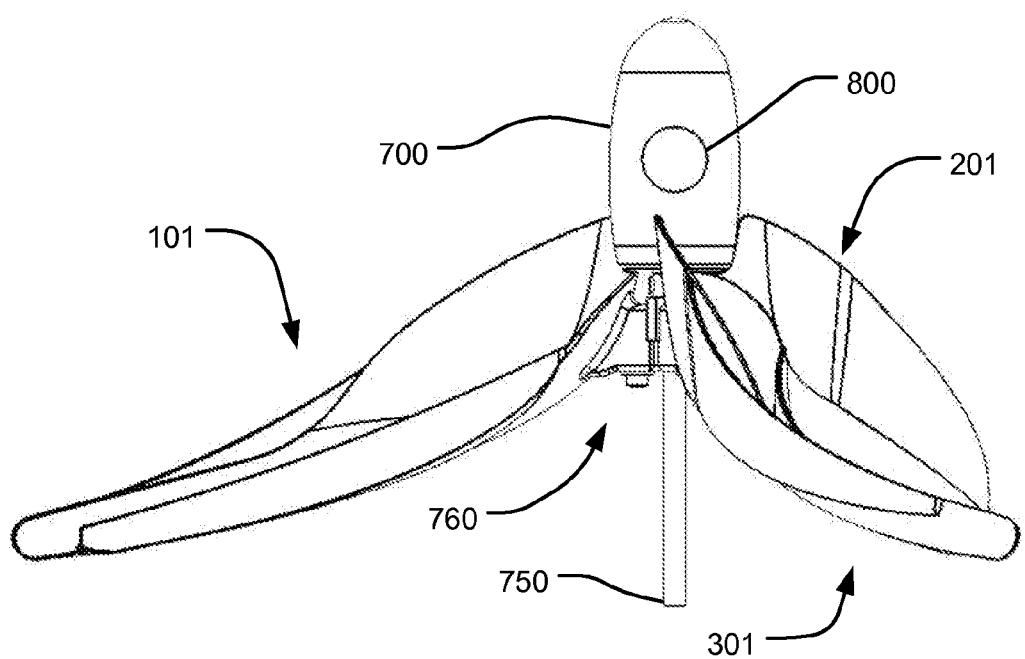
FIG. 5 illustrates a bottom plan view of an exemplary embodiment of a trillium wind turbine.

FIG. 5 illustrates a bottom plan view of an exemplary embodiment of a trillium wind turbine 100. The tower 800 and nacelle 700 are visible in this view as is a single attachment block 760. Because of the position of the blades 101, 201, and 301, all three can be seen. FIG. 5 illustrates the backwards pitch of the blades relative to the nacelle 700. The backward pitch reduces the amount of shear stress on the tower and/or support structure (similar to the reduced shear resistance of a swept back or delta wing of a jet fighter), and the horizontal dynamic load that needs to be appropriately restrained by the foundation of the trillium wind turbine apparatus.

Figure 6:
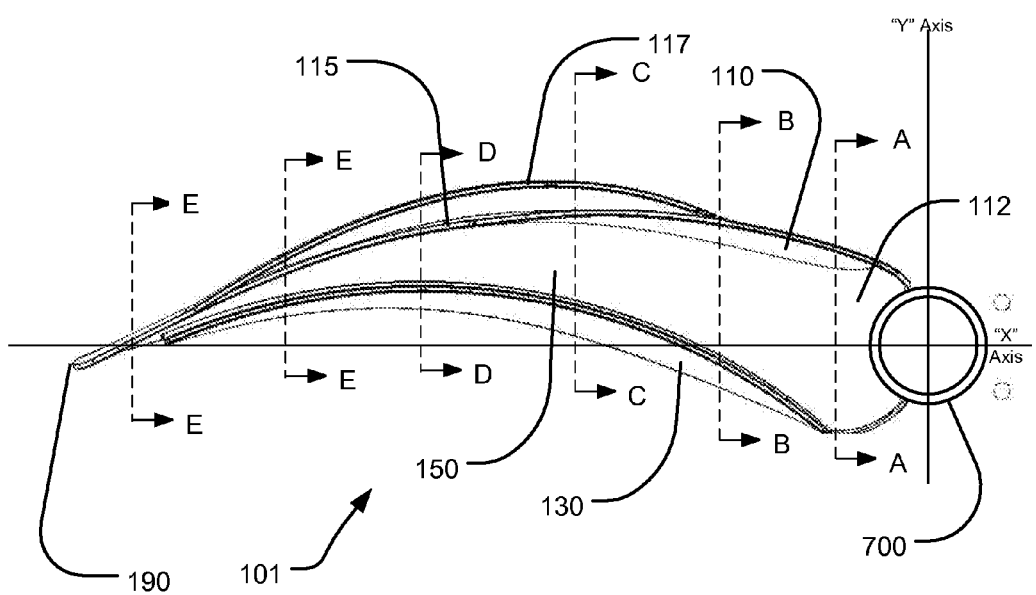
FIG. 6 illustrates a front elevation view of an exemplary blade of a trillium wind turbine showing a number of cross-section lines.

FIG. 6 illustrates a front elevation view of an exemplary blade 101 of a trillium wind turbine showing a number of cross-section lines A, B, C, D, E, and F. The nacelle 700 displays an "X" axis and a "Y" axis; the "Z" axis is positioned at the origin of the "Y" and "X" axes and extends outwards from the Figure so is it not visible in FIG. 6, see FIGS. 7A-7F. The "X" axis helps to show the overall curvature and twist of the exemplary embodiment of the blade 101 shown in FIG. 6.

Extending back from the nacelle 700 is the main blade 150 which makes up a large portion of the blade 101 itself. Nearest the nacelle 700, the blade 101 has an edge extension 110 that extends from the main blade 150 and helps to catch and direct more wind onto/into the blade 101. The first cross-section, labeled A, is taken through the edge extension 110 and the beginning curve of the main blade 150 (see FIG. 7A, cross-section).

Running along the outer leading edge 115 of the edge extension 110 is the diversion blade 117. The diversion blade 117 is attached to the outer surface of the edge extension 110 and extends outwards to attach to the back surface of the main blade 150 near the tip 190. As can be seen in the cross-section of FIGS. 7A-F, the diversion blade 117 is at a pitch relative to the direction of the wind. Between the two attachment points, the diversion blade 117 bows outwards from the leading edge 115 and creates a gap between itself and the main blade 150. This gap allows the diversion blade 117 to divert some of the wind behind the blade 101 so as to not interfere with the wind traveling along the length of the main blade 150 from the nacelle 700 to the tip 190. It is important to note that a secondary purpose of the diversion blade 117 is that when wind hits the diversion blade 117, it produces additional lift. The second cross-section, labeled B, is taken just before the diversion blade 117, and includes the edge extension 110, the curve of the main blade 150, and the trailing edge blade 130 (see FIG. 7B, cross-section).

The trailing edge blade 130 extends outwards from the main blade 150 generally in parallel to the direction of the wind so that the wind is blowing across it. The trailing edge blade 130 functions in part to keep the wind "in" and acting upon the main blade 150 as it travels down the blade. Furthermore, the underside of the trailing edge blade 150 is at a pitch relative to the wind direction, thus producing additional lift. The third and fourth cross-sections, labeled C and D, respectively, include the diversion blade 117, the outer leading edge 115 of the edge extension 110 and the edge extension 110 itself, the curve of the main blade 150, and the trailing edge blade 130.

The fifth cross-section, labeled E, includes the diversion blade 117 but not edge extension 110 since it ended between D and E. Cross-section E also includes the main blade 150 and the trailing edge blade 130. The final cross-section is labeled F and is taken near the tip 190 of the main blade 150. The progression across the cross-sections helps to understand the changing nature of the underlying complex curves (see FIGS. 7A-7F).

The outer leading edge 115 changes orientation relative to the main blade 150 as you move from the nacelle 700 to the tip 190. This occurs because of the roughly ninety-degree twist in the main blade 150 as you move from the nacelle 700 to the tip 190.

The diversion blade 117 is at an angle of attack to the relevant wind, thereby adding additional lift to the turbine. The wind deflected by the diversion blade 117 is directed behind the main blade, and there imparts a positive aerodynamic influence by reducing the pressure behind the main blade. Additionally, the aerodynamic design of the nose-cone-shaped nacelle 700 diverts air to the blades.

FIGS. 7A-7F illustrate cross-sectional views of an exemplary blade 101 of a trillium wind turbine 100. Note the axes shown in FIGS. 6 and 7A-7F for reference in order to help orient the viewer to the locations of the cross-sectioned components. The viewer should understand that because the blade 101 is swept back and does not extend parallel to the "X" axis in FIG. 6, the cross-sections appear somewhat elongated. The "X" axis in FIGS. 7A-7F is located at the origin of the "Y" and "Z" axes, but extends "outwards" from the Figure towards the viewer so is not visible.

Figure 7A:
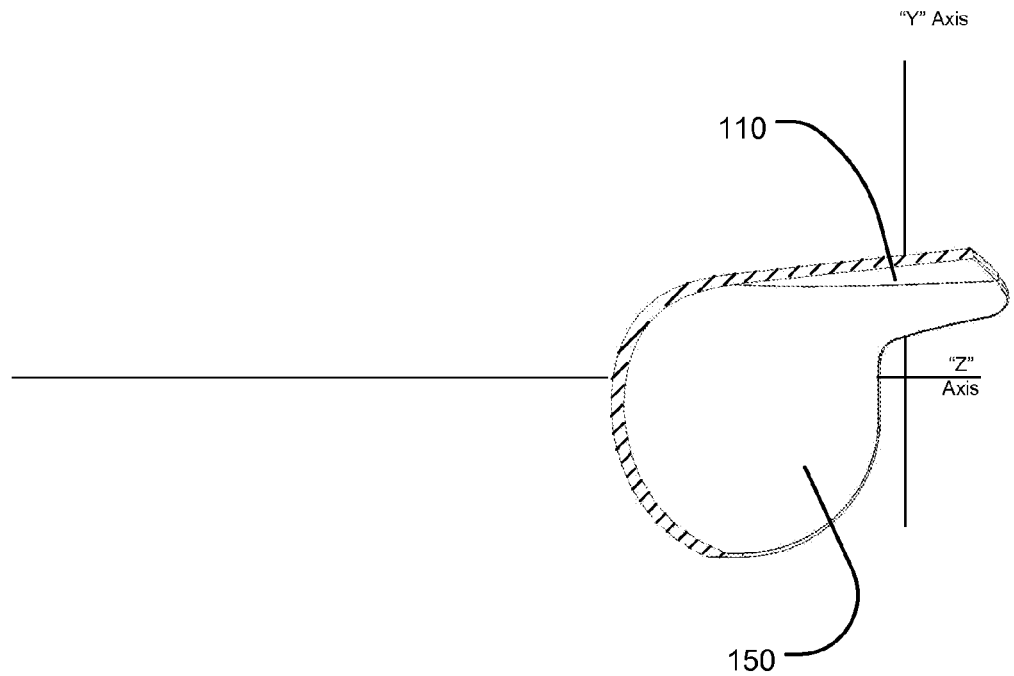
FIGS. 7A-7F illustrate cross-sectional views of an exemplary blade of a trillium wind turbine.

FIG. 7A illustrates a side elevation view of the "A" cross-section noted in FIG. 6. The front surface of the main blade 150 is illustrated in FIG. 7A. Given that the "X" axis extends outwards from the Figure towards the viewer, the swept-back nature of the main blade 150 should be apparent. The cupped nature of the main blade 150 is apparent form the cross-section, as is the relatively straight nature of the edge extension 110 that extends from the main blade 150.

Figure 7B:
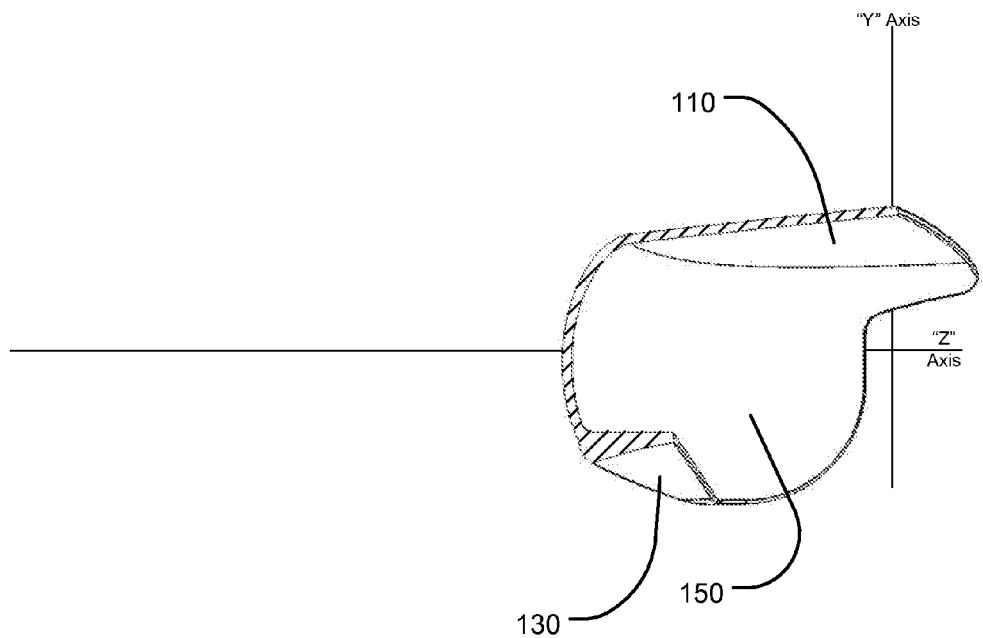

FIG. 7B illustrates a side elevation view of the "B" cross-section noted in FIG. 6. This cross-section view includes the features shown in FIG. 7A, while introducing the trailing edge blade 130.

Figure 7C:
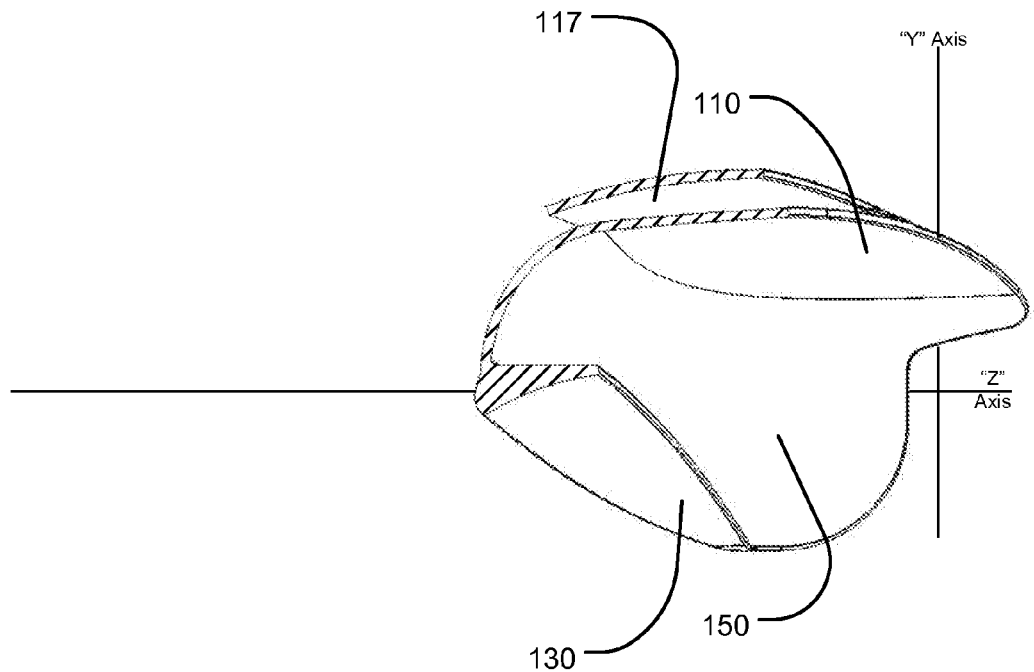

Cross-section "C" is illustrated in FIG. 7C and includes the same components as B, but is taken further down the main blade 150 so it introduces the diversion blade 117.

Figure 7D:
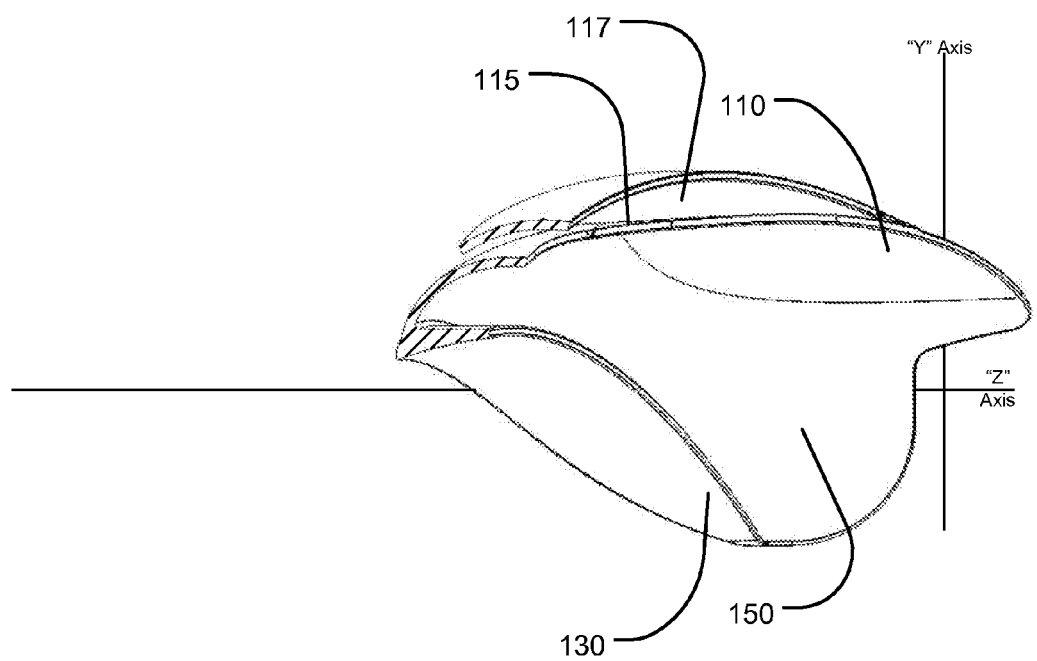

FIG. 7D illustrates cross-section "D" which highlights the fact that the gap between the diversion blade 117 and the main blade 150 first grows and then continues to narrow as you approach the blade tip. Further, the cup-like shape of the blade is very apparent in FIG. 7D.

Figure 7E:
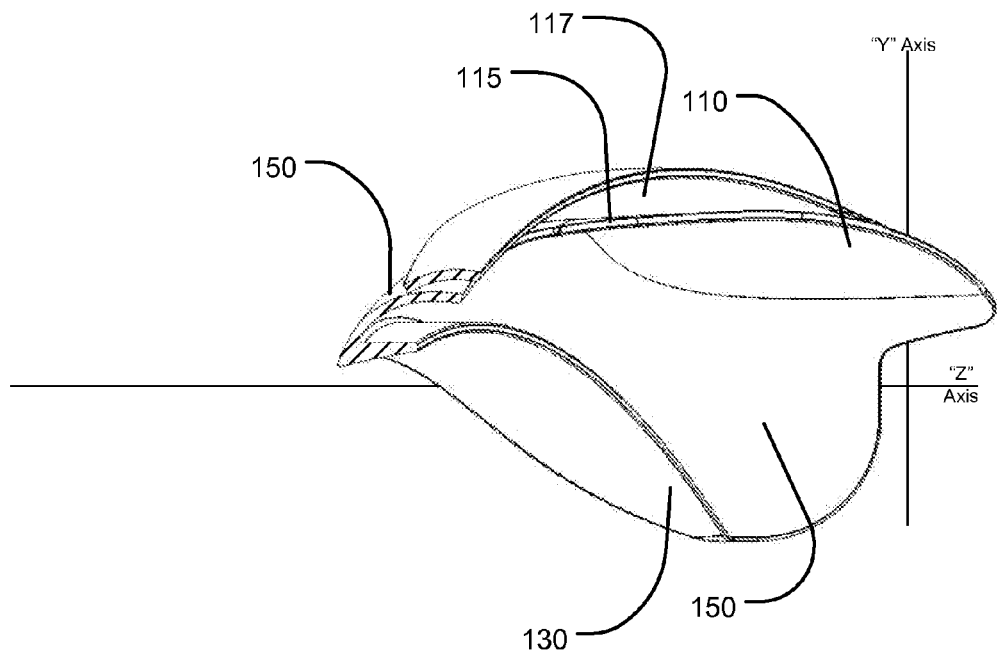

In cross-section E, shown in FIG. 7E, the twist of the main blade 150 is almost complete as the diversion blade 117 comes to an end. What little of the main blade 150 that remains near the blade tip is nearly parallel with the wind direction and the "X"-"Z" plane (formed by the "X" axis and the "Z" axis). In some embodiments, the cross-sections B to E will have a trailing edge blade at an angle of attack to the relevant wind thereby providing additional lift. In yet other embodiments, the components described above will have varying angles as the rate of twist and/or overall twist can be greater than or less than that described above.

Figure 7F:
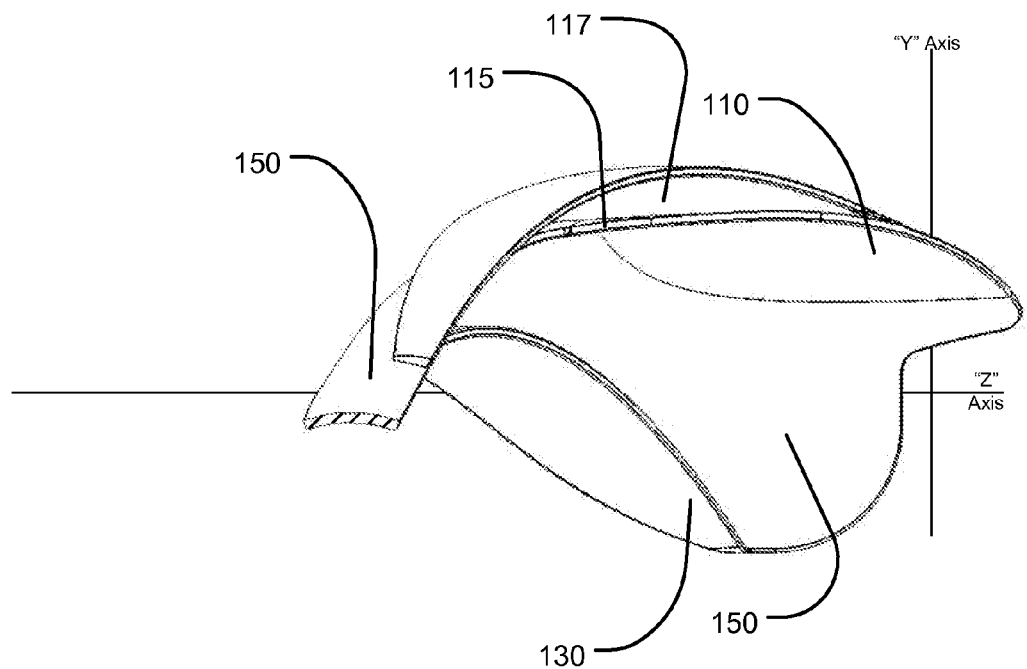

FIG. 7F illustrates cross-section "F" which highlights the fact that the diversion blade 117 and the trailing edge blade 130 both come to an end before the tip of the blade is reached. In FIG. 7F, only the main blade 150 remains to extend through the tip of the blade.

Figure 8:
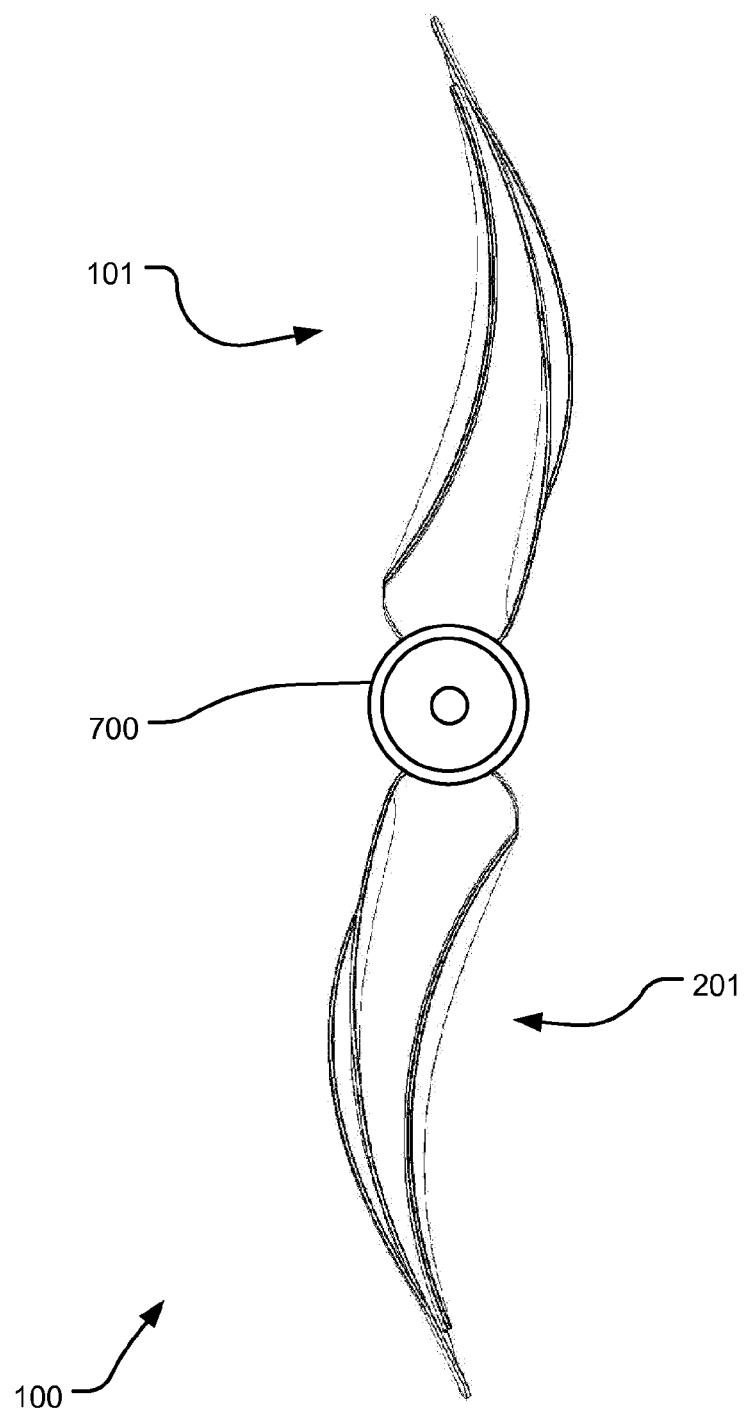
FIG. 8 shows a front elevation view of an exemplary embodiment of a trillium wind turbine having only two blades.

FIG. 8 shows a front elevation view of an exemplary embodiment of a trillium wind turbine having only two blades 101 and 201. As discussed above, a trillium wind turbine can have any number of blades. Here, a two-blade wind turbine 100 is illustrated. Note that the nacelle 700 is also shown. Although not explicitly shown, the connection components (the attachment blocks) that connect the blades 101 and 201 to the rotor shaft can include a mechanism to automatically furl the blades in high-wind situations. In order to see more detail of the blades, the tower is not shown in FIG. 8.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of the invention can be modified, if necessary, to employ the systems, functions, and concepts of the various references to provide yet further embodiments of the invention.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. A trillium wind turbine apparatus, comprising:
    an aerodynamically shaped, electricity generating nacelle having a nose;
    a support tower rotationally attached to the nacelle such that the nacelle can freely rotate around a support tower longitudinal axis in response to a wind in order to automatically position the nacelle so that the nose is pointed into the wind;
    a plurality of complexly-curved blades, wherein each blade has a main blade forming the main body of the blade and extending along a main blade longitudinal axis from a proximal end to a distal end, a trailing edge blade attached to and extending from the main blade, a diversion blade shaped so as to direct a portion of the wind behind the main blade, an edge extension extending from the main blade and configured to catch and direct wind towards the main blade, a leading edge, and a tip; and
    wherein each of the plurality of blades is attached to a rotor shaft behind the nacelle in a swept back orientation, thus functioning as a vane which points the nacelle and plurality of blades into the wind.

2. The trillium wind turbine apparatus of claim 1, wherein the proximal end of the main blade is attached to the rotor shaft and the tip is located at the distal end, and the main blade is shaped so as to approximate a partial cylinder of decreasing diameter from the proximal end to the distal end.

3. The trillium wind turbine apparatus of claim 2, wherein the main blade is twisted about the main blade longitudinal axis and a face of the main blade twists up to one hundred degrees from the proximal end to the distal end.

4. The trillium wind turbine apparatus of claim 2, wherein the number of blades is two.

5. The trillium wind turbine apparatus of claim 2, wherein the number of blades is three.

6. The trillium wind turbine apparatus of claim 1, wherein the main blade is twisted about the main blade longitudinal axis and a face of the main blade twists up to one hundred degrees from the proximal end to the distal end.

7. The trillium wind turbine apparatus of claim 6, wherein the number of blades is two.

8. The trillium wind turbine apparatus of claim 6, wherein the number of blades is three.

9. The trillium wind turbine apparatus of claim 1, wherein the number of blades is two.

10. The trillium wind turbine apparatus of claim 1, wherein the number of blades is three.

11. A trillium wind turbine apparatus, comprising:
    an aerodynamically shaped, electricity generating nacelle having a nose and a back portion;
    a support tower rotationally attached to the nacelle such that the nacelle can freely rotate around a support tower longitudinal axis in response to a wind in order to automatically position the nacelle so that the nose is pointed into the wind;
    a rotor shaft extending from the back portion of the nacelle;
    a plurality of blades attached to the rotor shaft and extending in a swept-back configuration from the nacelle such that the blades act as a vane and function to keep the nacelle nose pointed into the wind;
    wherein the plurality of blades each comprise:
        a main blade extending along a main blade longitudinal axis from a proximal end to a distal end and having a blade tip at the distal end;
        an edge extension protruding out from a top edge of the main blade and attached thereto and wherein the edge extension begins in proximity to the proximal end and extends down the main blade towards the distal end, the edge extension first increasing in height from the main blade and then decreasing in height;
- a trailing edge blade protruding out from a bottom edge of the main blade and attached thereto and wherein the trailing edge blade begins in proximity to the proximal end and extends down the main blade towards the distal end, the edge extension first increasing in height from the main blade and then decreasing in height;
- a combination comprising the main blade, the edge extension, and the trailing edge blade, the combination being cupped inwards so as to have a volume and an inner surface area, the combination catching and directing the wind down a length of the blade; and
- a diversion blade attached to the combination near the proximal end and above the combination and configured to direct a portion of the wind around behind the main blade; and the plurality of blades rotated by the wind, causing the rotor shaft to rotate and thereby causing the nacelle to generate electricity.

12. The trillium wind turbine apparatus of claim 11, wherein the inner surface area of the combination reduces from at least the center of the length of the blade to the tip.

13. The trillium wind turbine apparatus of the claim 12, further comprising:
the main blade is twisted along the length, wherein near the proximal end, a front surface of the main blade faces approximately forwards into the wind and near the distal end, the front surface of the main blade faces approximately downwards.

14. The trillium wind turbine apparatus of the claim 11, wherein the volume of the combination reduces from at least the center of the length of the blade to the tip.

15. The trillium wind turbine apparatus of the claim 14, further comprising:
the main blade is twisted along the length, wherein near the proximal end, a front surface of the main blade faces approximately forwards into the wind and near the distal end, the front surface of the main blade faces approximately downwards.

16. The trillium wind turbine apparatus of claim 15, wherein the number of blades is two.

17. The trillium wind turbine apparatus of claim 15, wherein the number of blades is three.

18. The trillium wind turbine apparatus of the claim 11, further comprising:
the main blade is twisted along the length, wherein near the proximal end, a front surface of the main blade faces approximately forwards into the wind and near the distal end, the front surface of the main blade faces approximately downwards.

19. The trillium wind turbine apparatus of claim 11, wherein the number of blades is two.

20. The trillium wind turbine apparatus of claim 11, wherein the number of blades is three.

* * * * *